US011874153B2

(12) United States Patent
Bouldin

(10) Patent No.: US 11,874,153 B2
(45) Date of Patent: Jan. 16, 2024

(54) MEASURING FLOWER

(71) Applicant: Shelley Bouldin, Cincinnati, OH (US)

(72) Inventor: Shelley Bouldin, Cincinnati, OH (US)

(*) Notice: Subject to any disclaimer, the term of this patent is extended or adjusted under 35 U.S.C. 154(b) by 0 days.

(21) Appl. No.: 17/676,206

(22) Filed: Apr. 22, 2022

(65) Prior Publication Data
US 2023/0341250 A1 Oct. 26, 2023

(51) Int. Cl.
G01F 19/00 (2006.01)
(52) U.S. Cl.
CPC .................... G01F 19/00 (2013.01)
(58) Field of Classification Search
CPC ........................................ G01F 19/00
See application file for complete search history.

(56) References Cited

U.S. PATENT DOCUMENTS

| 3,498,136 A * | 3/1970 | Le May ............... G01F 19/00 73/426 |
| 5,516,038 A * | 5/1996 | Zaccarini ............ G01F 19/00 206/769 |
| 8,061,197 B2 * | 11/2011 | Silvers ................ G01F 19/00 73/426 |
| 9,976,891 B1 * | 5/2018 | Fanton ................. G01F 11/42 |
| 2014/0060179 A1 * | 3/2014 | Mohammad ........ G01F 19/007 73/427 |
| 2014/0203050 A1 * | 7/2014 | Blackburn ........... G01F 11/261 29/428 |
| 2015/0346011 A1 * | 12/2015 | Shepard .............. G01F 11/261 222/1 |

FOREIGN PATENT DOCUMENTS

JP 2017211181 A * 11/2017

* cited by examiner

*Primary Examiner* — Jamel E Williams

(57) ABSTRACT

The Connected Measuring Apparatus Measuring Flower is a measuring apparatus that includes fillable cavities that are specifically sized according to the amount of stuff needed. When the fillable cavities are filled with measurable stuff, the stuff can be stored until needed.

10 Claims, 6 Drawing Sheets

MEASURING FLOWER

FIELD OF INVENTION

This invention relates to the field of measure, more specifically to the area of measuring liquids, solids, granular, and all other materials that can be measured.

BACKGROUND OF INVENTION

I was in my kitchen making biscuits for my family. I tried to pour the salt in the small measuring spoon and the salt came out slowly at first, then suddenly there was a rush of salt. It overflowed the measuring spoon and spilled all over my countertop and myself. Cleaning up the mess I prayed, "There has got to be a better way of doing this. Lord, please show me a better way".

Often times when measuring materials, there are spills that occur. These spills result in messy cleanup, which leads to waste of the materials, time and energy. Considering these things, there is a need for an invention that will allow materials to be measured without the possibility of spills and/or waste. This invention solves this problem. In addition to the above solution, this invention also allows the user to measure materials simultaneously when filling more than one fillable cavity at the same time. All the materials can be placed in the fillable cavities at one time and, if using this invention with food materials, the user can put the materials into a mixing bowl with one motion. Thus reducing the time it takes to complete recipes and reducing the washing and reusing of measuring spoons.

BRIEF SUMMARY OF INVENTION

There continues to be a need for a spill proof measuring apparatus to solve the issues noted above. This invention can be used attached to a container filled with materials to be measured or independent of a container. Using with a container, the diameter and depth of this invention will change depending on the size of the container. Using independently of a container, the material to be measured is placed directly in the connected fillable cavities. This invention is a simple straight forward design that is needed in the home to make measuring easier and faster.

This invention takes the well known measuring devices and combines them into 1 easy to operate apparatus. It eliminates spills when used with a container and saves time when used independently.

This invention has 3 connected parts. Part 1 is the threaded or non-threaded bottom. Part 1 has pull tabs that slide in and out from the middle to the edge. Part 2 is the connected fillable cavities. These fillable cavities are sized according to the amount of materials needed to be measured. Part 3 is comprised of caps that snap and close, keeping the material in the cavity until needed.

The above detail associated with the connected measuring apparatus has been presented for illustration and description purposes only, it is not meant to be a limiting description or illustration, many modifications and variations are possible, and the scope is therefore not limited to the details or descriptions noted above, the intent of the scope described is meant to cover all alternatives, modifications, variations, and equivalents.

DESCRIPTION OF PREFERRED EMBODIMENTS

The following description of the preferred embodiments of the invention is not intended to limit the invention to these preferred embodiments, but rather to enable any person skilled in the art to make and use this invention.

Figure 1:
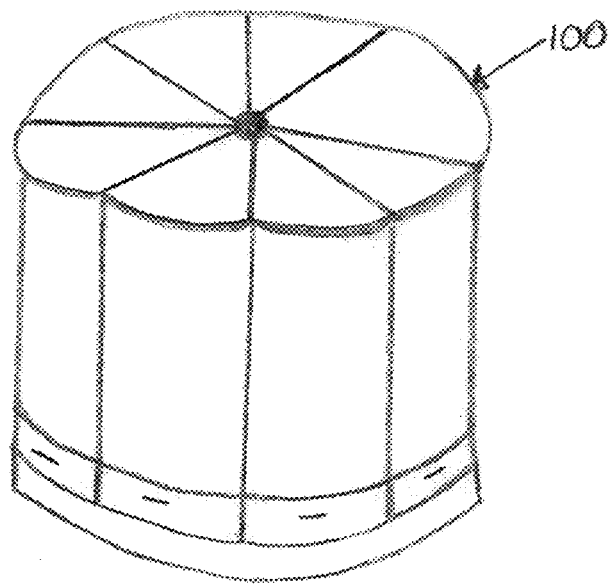
FIG. 1 is an isometric view of the top of a variation of the invention.
Figure 2:
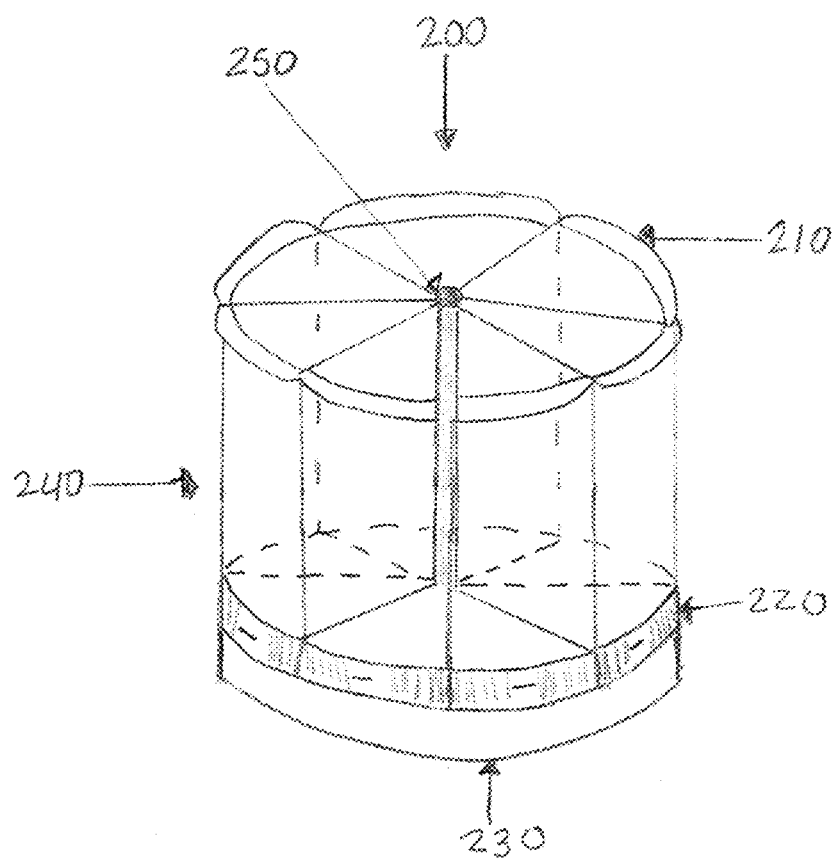
FIG. 2 is an isometric view of the top front variation, through to the back.
Figure 3:
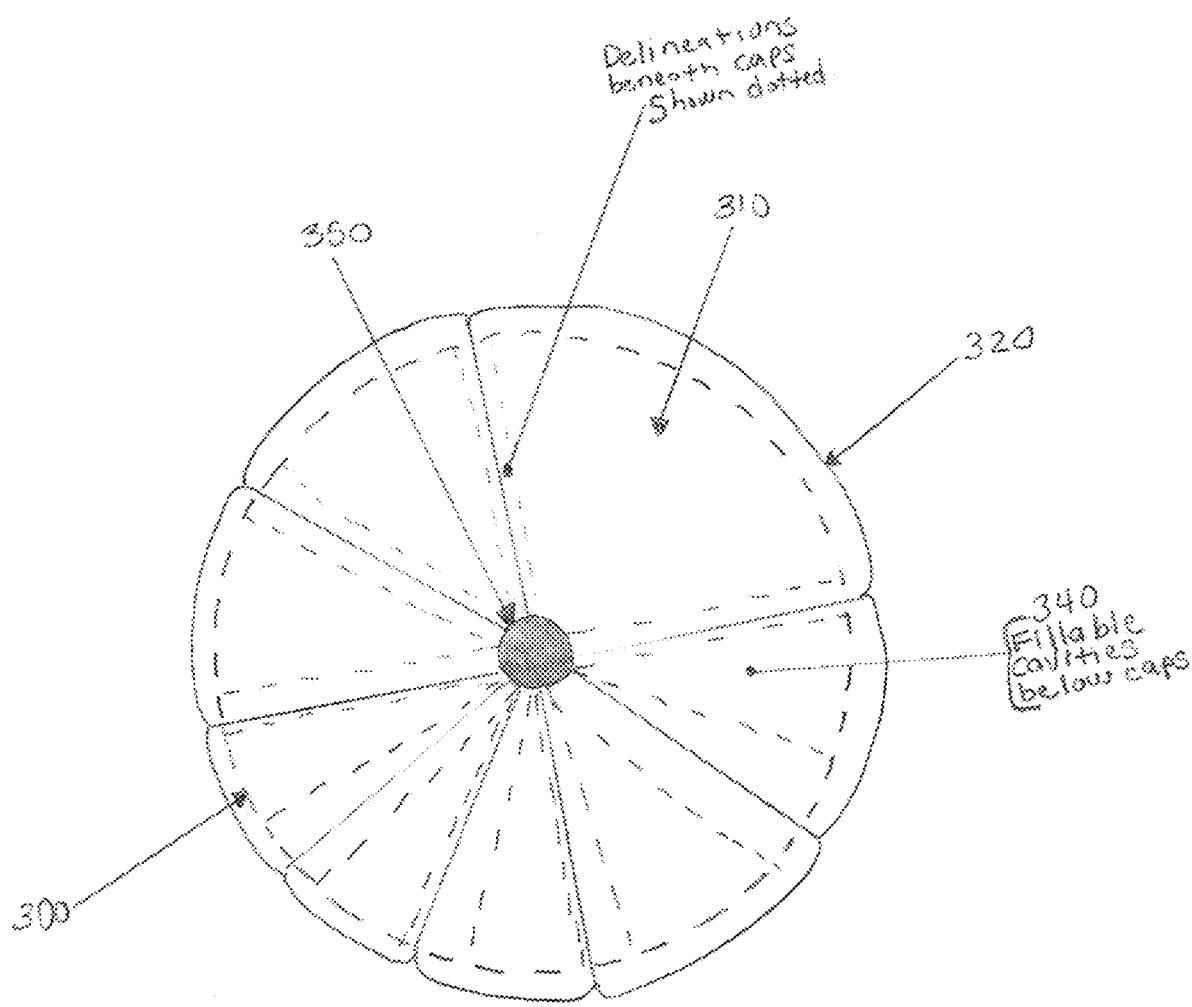
FIG. 3 is a schematic representation of a variations of the top.
Figure 4:
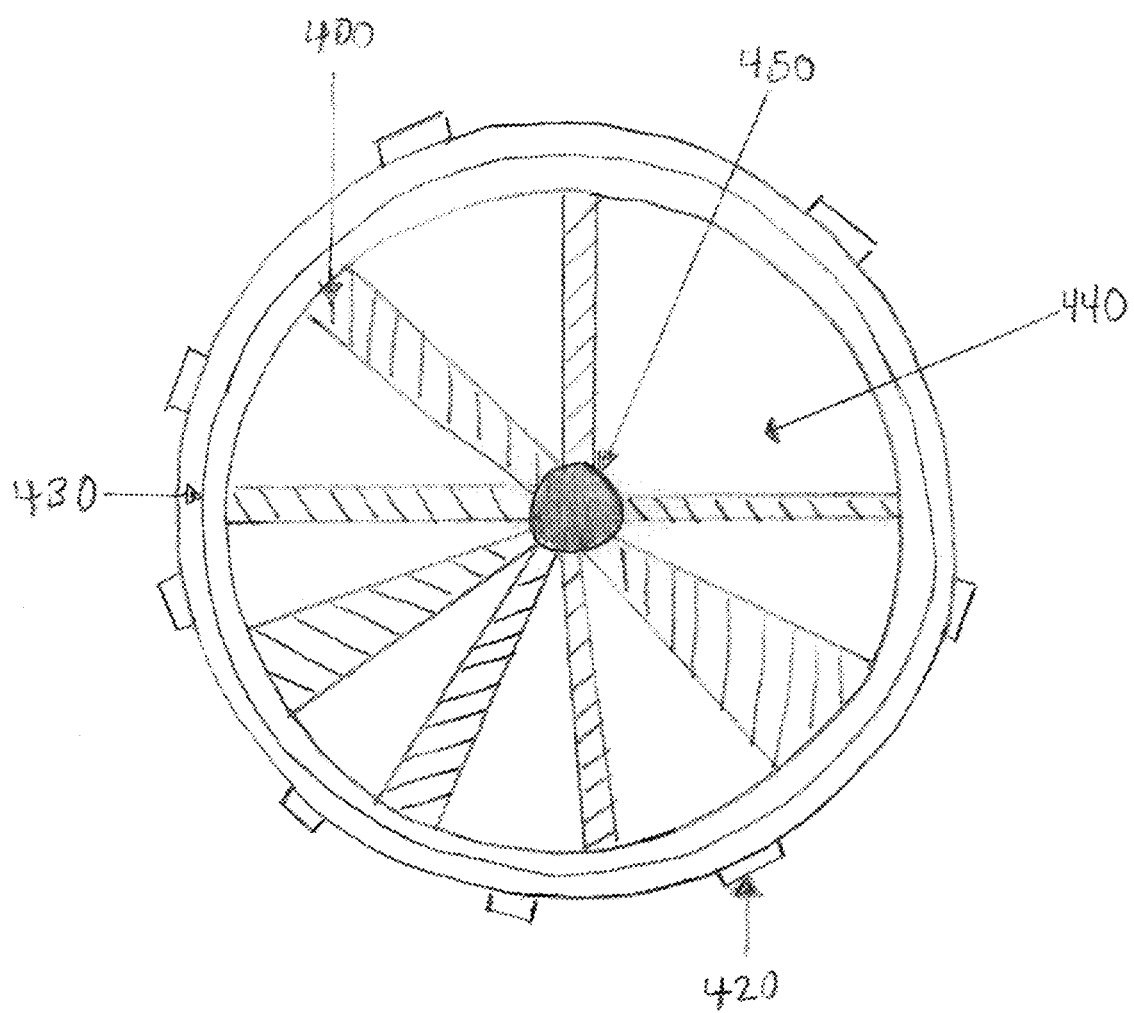
FIG. 4 is a schematic representation of a variation of the bottom.
Figure 5:
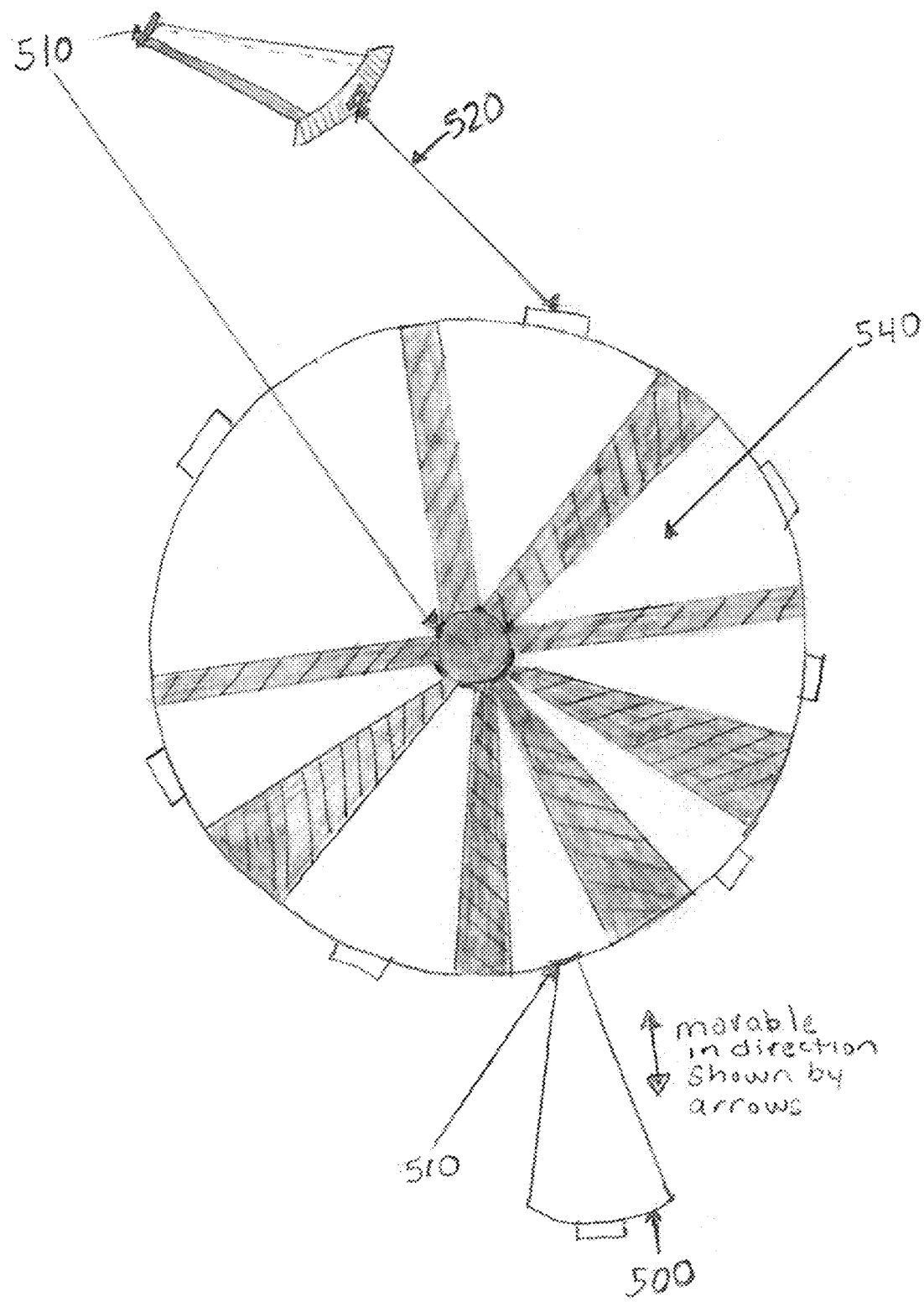
FIG. 5 is a schematic representation of another variation of the bottom.
Figure 6:
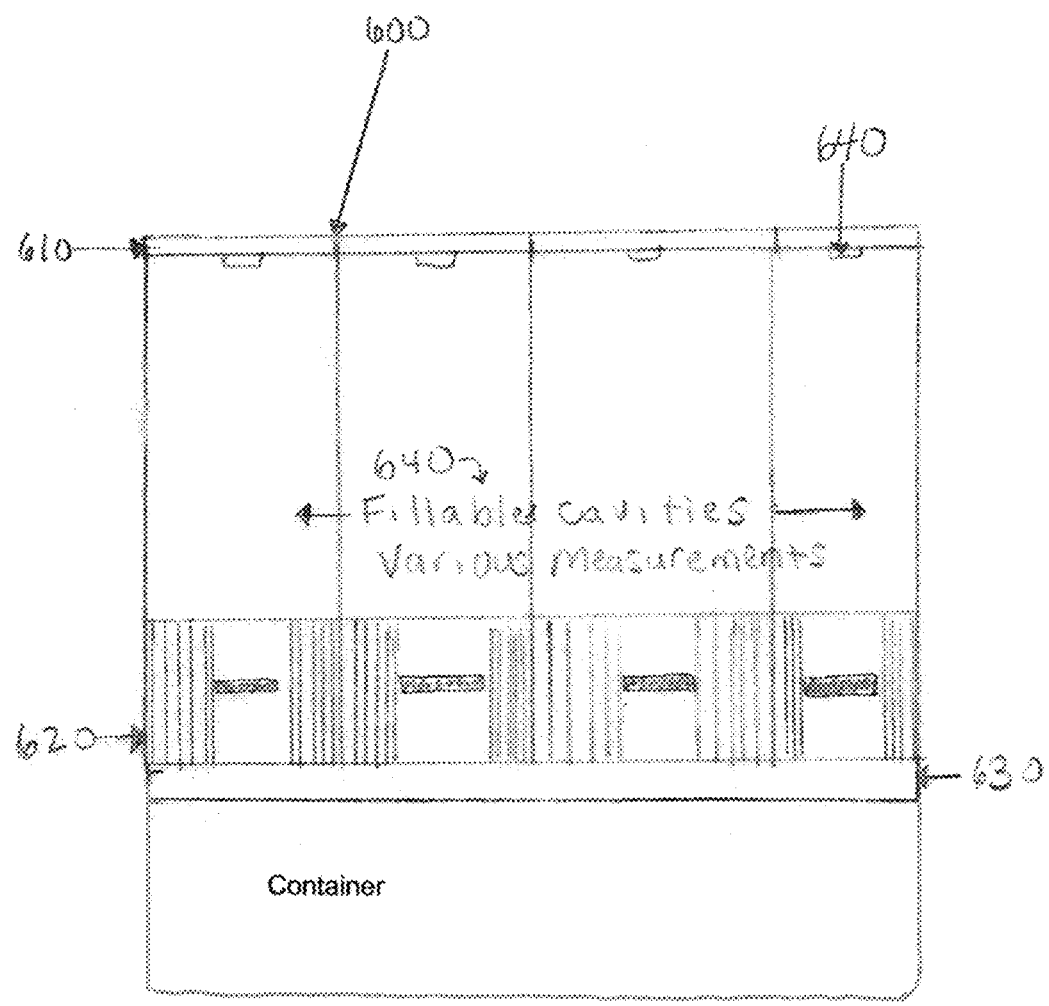
FIG. 6 shows a schematic representation of a variation of the side

There can be many variations of this invention. This invention is shown to be a cylinder shape, 100. The size of this invention will vary depending on the units of measure. For example, if the unit of measure is a variation of a cup, the size of the invention will be bigger than if the unit of measure is a variation of a spoon, or any other unit materials can be measured in. If liquid material being measured, ounces will cause the invention to be smaller than measuring gallons, and any unit liquid material can be measured in. The size of this invention will also vary according the container it is attached to. This invention can be produced from many materials, 100. The material select must be rigid, able to hold its shape, must be able to be connected to a container, variation, (430), and food friendly, (variation). The material (s), used to produce this invention must also be flexible enough to make movable caps, (250), and the pulls, (500, 520). The material(s), used to produce this invention must be rust and mold resistant, water, soap, dishwasher safe. The materials used can be any color and formable into any shape. The bottom of this invention is comprised of connected sections, (220, 230 and 620, 630). When used with a container, this invention has threads, (430), that allow this invention to be attached to the container using a turning motion. A variation of this invention at the connection to the container may be necessary depending on the container being used. When not used with a container, the variation of this invention will not be able to connect to any other thing. This invention has tabs, (500), that can be moved from the center to the outer edge. The tab has a small handle on the outside of the invention, (420, 520), to help move the tab. The tab has a stopping mechanism (510), on the inside of the tab to prevent the tab from completely leaving the invention. Each tab, (220), is directly below each fillable cavity, (240, 640). The tab's function, when opened, (500), is to allow the fillable cavity, to be filled with the stuff to be measured. The tab's function when closed, (540), is to keep the measured stuff in the fillable cavity until needed. This invention has a variation of connected fillable cavities, (240, 340, 440). These fillable cavities are sized according to the unit of measure being measured. A variation of this invention is if a spoon, cup, ounce, liter, milliliter, grams, etc. needs to be measured. Each fillable cavity would be premeasured and labeled accordingly. The labels will be on the outside, top, or bottom, (640, 310, 440), of the invention. The fillable cavities have a tab, (500), at the bottom and a cap, (310), at the top. The fillable cavities are connected by and separated by solid delineations, (400). The delineations also serve to make the fillable cavities the correct size according to the unit of measure being measured, therefore, the delineations themselves will vary in size and shape. The delineations are the full height of the fillable cavities, (600). The delineations are wrapped around a solid center, (450). This solid center is the full height of the fillable cavities and the caps, (250, 350). The solid center can vary in size and shape based on the unit of measure being measured. The solid center is in the center of the invention. The cap is located at the top of this invention, (210). The cap covers each of the connected fillable cavities, (340), and the associated delineations, (FIG. 3), next to the fillable cavities. Each cap has a method of opening and closing. When the cap is closed, the method should include the cap remaining closed. This method allow stuff being measured to remain in the fillable cavities, when not needed. This method also allows the stuff being measured to be released from the fillable cavities when needed. This invention can be sold with an empty container already attached or without a container attached. This is helpful if the consumer buys in bulk.

I claim:

1. The connected measuring apparatus for measuring granular, solid, and liquid, materials is comprised of a plurality of tabs, a solid center, a plurality of fillable cavities and corresponding caps, delineations, and a threaded portion configured to attach the apparatus to a container.

2. The apparatus of claim 1, further comprising a plurality of individual tabs that are located at the bottom of each fillable cavity; wherein the tabs allow materials to enter the fillable cavities and retains the material in the fillable cavities, wherein the tabs move independently of the fillable cavities from the solid center to the outer edge, wherein the tabs are not completely removable from the apparatus.

3. The apparatus of claim 1, further comprising pulls which are located on the outside of each tab to aid with the movement of each tab from the solid center to the outer edge.

4. The apparatus of claim 1, wherein the fillable cavities are divided according to the unit of measure being measured and are configured to hold the measurable material, and hold an exact amount of a substance; wherein the unit of measure is labeled on the outside surface of the fillable cavity.

5. The apparatus of claim 1, further comprising delineations which are located between each fillable cavity, wherein the delineations are fixed according to the unit of measure, and make the fillable chambers the correct unit of measure.

6. The apparatus of claim 1, wherein the solid center is cylindrical in shape and located in the center of the apparatus; wherein the caps, fillable cavities, and tabs are all connected to the solid center.

7. The apparatus of claim 1, wherein the caps are movable in an open and close manner and located at the opposite end of the fillable cavities than the tabs.

8. The apparatus of claim 1, wherein the caps fit over each fillable cavity and the delineations; wherein the caps retain the measurable materials in the fillable cavities, and allow the measurable materials to be released as needed.

9. The apparatus of claim 1, wherein the apparatus is threadedly attachable to a container, wherein threads are located under the tabs.

10. The apparatus of claim 1, wherein the caps are hinged on the apparatus at the solid center; and wherein the hinge allows the caps to move up in an open position and down to a closed position.

* * * * *